United States Patent
Matsuno

(10) Patent No.: US 6,567,748 B2
(45) Date of Patent: May 20, 2003

(54) MOTION CONTROL SYSTEM FOR VEHICLE

(75) Inventor: Koji Matsuno, Tokyo-To (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 09/796,682

(22) Filed: Mar. 2, 2001

(65) Prior Publication Data

US 2001/0020217 A1 Sep. 6, 2001

(30) Foreign Application Priority Data

Mar. 3, 2000 (JP) .......................................... 2000-59260

(51) Int. Cl.⁷ .............................................. B60R 21/00
(52) U.S. Cl. ...................... 701/301; 701/117; 180/274; 180/275; 180/280; 340/435; 340/436; 340/903; 348/118
(58) Field of Search .................................. 701/301, 117; 180/274, 275, 280; 340/903, 435, 436; 348/118

(56) References Cited

U.S. PATENT DOCUMENTS

| | | | |
|---|---|---|---|
| 5,332,057 A | * 7/1994 | Butsuen et al. | 180/169 |
| 5,410,346 A | * 4/1995 | Saneyoshi et al. | 348/116 |
| 5,540,298 A | 7/1996 | Yoshioka et al. | 180/169 |
| 5,699,040 A | * 12/1997 | Matsuda | 180/169 |
| 5,790,403 A | * 8/1998 | Nakayama | 340/435 |
| 6,021,375 A | * 2/2000 | Urai et al. | 701/301 |
| 6,084,508 A | 7/2000 | Mai et al. | 340/463 |
| 6,157,892 A | * 12/2000 | Hada et al. | 180/169 |
| 6,269,308 B1 | * 7/2001 | Kodaka et al. | 340/435 |

FOREIGN PATENT DOCUMENTS

| | | |
|---|---|---|
| DE | 3830790 | 3/1990 |
| DE | 19647283 | 5/1997 |
| EP | 0 891 903 | 1/1999 |

* cited by examiner

Primary Examiner—Michael J. Zanelli
Assistant Examiner—Eric M Gibson
(74) Attorney, Agent, or Firm—Smith, Gambrell & Russell, LLP

(57) ABSTRACT

A motion control system controls a vehicle so as to avoid contacting an obstacle in front of the vehicle by applying a braking force or a turning force to the vehicle. In particular, the turning force is applied to the vehicle to avoid the obstacle by turning the vehicle when the system judges that the vehicle can not avoid contact with the obstacle with deceleration presently applied. The turning force is calculated by comparing a first turning force necessary to make a turn to avoid the obstacle with a second turning force presently applied to the vehicle. The system generates the turning force presently applied to the vehicle. The system generates the turning force by controlling at least one of a braking force of a selected wheel, a front wheel steering mechanism and a rear wheel steering mechanism.

16 Claims, 7 Drawing Sheets

MOTION CONTROL SYSTEM FOR VEHICLE

BACKGROUND OF THE INVENTION

1. Field of the invention

The present invention relates to a motion control system for a vehicle and more particularly to a motion control system capable of avoiding a contact with an obstacle by turning around the obstacle.

2. Prior art

In recent years, in order to avoid collisions with obstacles ahead of a vehicle, an automatic brake control system has been developed in which the distance between the vehicle and an obstacle is detected based on images taken by a stereoscopic camera or a laser-beam radar, and when the distance is smaller than a predetermined value, the brake is applied automatically.

For example, Japanese Patent Application Laid-open No. Toku-Kai-Hei 7-149193 discloses a technique in which when the distance between detected by an inter-vehicle distance detecting apparatus is smaller than a calculated safe distance, an automatic brake is operated. In this technique, the safe distance is calculated taking a maximum deceleration which the vehicle can generate according to the condition of tires of respective wheels, road gradients and the like into consideration.

The technique for preventing collisions with obstacles is largely dependant upon how to calculate a deceleration of the vehicle. Since there are many factors affecting the deceleration of the vehicle, it is difficult to take all of these factors into consideration and therefore there is no assurance that the vehicle can stop before an obstacle. Further, an extreme deceleration is not preferable.

SUMMARY OF THE INVENTION

It is an object of the present invention to provide a motion control system capable of surely avoiding contact with an obstacle located at the front of a vehicle by turning.

In order to attain the object, a motion control system including an obstacle recognition means for detecting an obstacle in front of the vehicle and for obtaining an information of the obstacle and a running condition detecting means for detecting running conditions of the vehicle, comprises a braking distance judging means for when a deceleration is applied to the vehicle judging whether or not the vehicle can finish the deceleration without contacting the obstacle based on the information of the obstacle and the running conditions, a first parameter calculating means for calculating a first parameter necessary to take a lateral avoidance motion based on the obstacle information and the running conditions, a second parameter calculating means for calculating a second parameter representing a parameter presently generating in the vehicle based on the running conditions, a target parameter establishing means for when it is judged that the vehicle can not finish the deceleration without contacting the obstacle, establishing a target parameter by comparing the first parameter with the second parameter and a vehicle behavior control means for generating the lateral avoidance motion of the vehicle at least in accordance with the target parameter.

DETAILED DESCRIPTION OF PREFERRED EMBODIMENTS

Figure 1:
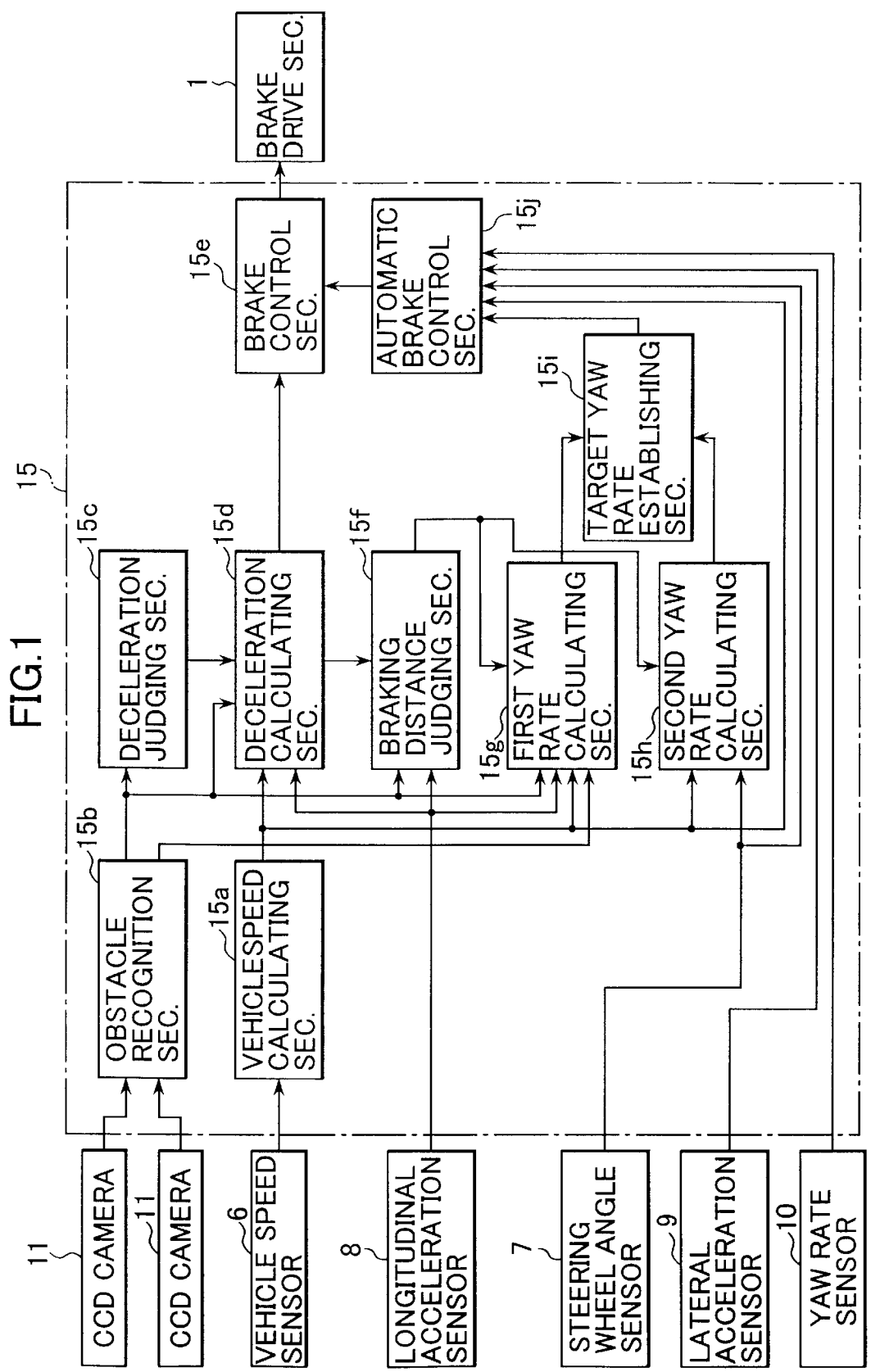
FIG. 1 is a functional block diagram showing a vehicle motion control system according to a first embodiment of the present invention.
Figure 2:
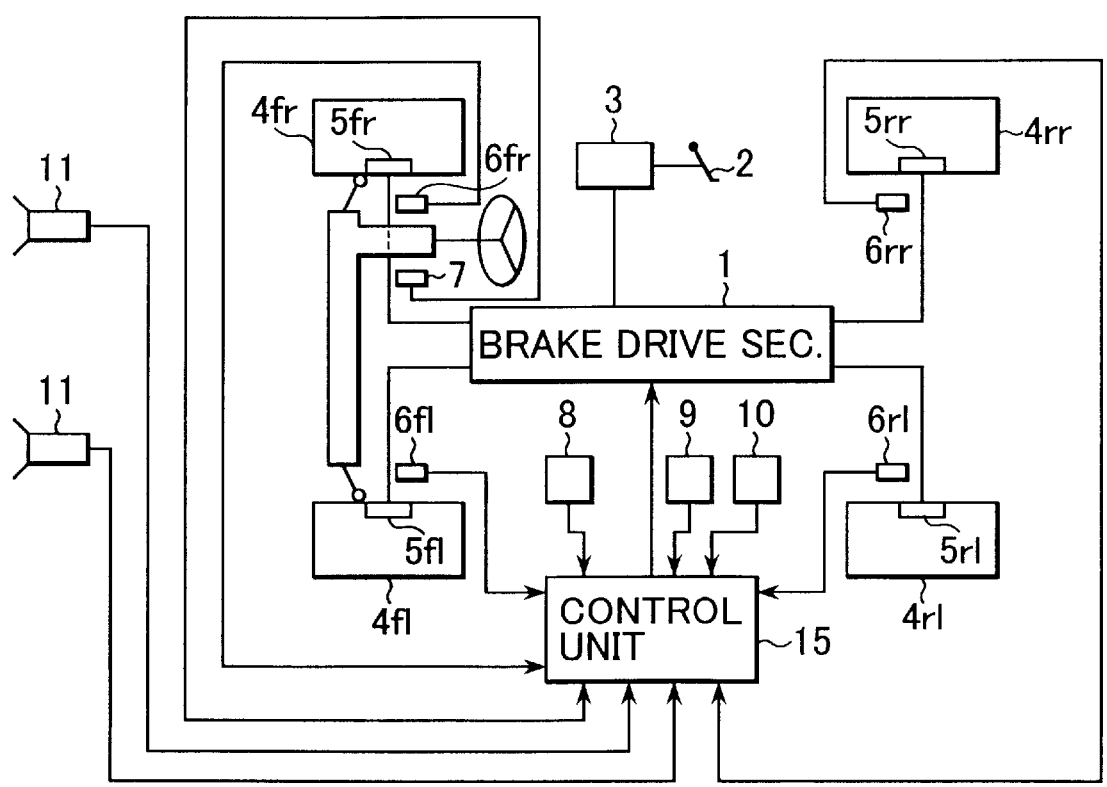
FIG. 2 is an explanatory view showing an overall schematic construction of a vehicle motion control system according to the first embodiment.

Referring now to FIG. 2, reference numeral 1 denotes a brake drive section of a vehicle, to which a brake pedal 2 is connected through a master cylinder 3. When a driver operates the brake pedal 2, the master cylinder generate a brake pressure and distributes the brake pressure to respective wheel cylinders 5 (left front wheel cylinder $5_{fl}$, right front wheel cylinder $5_{fr}$, left rear wheel cylinder $5_{rl}$ and right rear wheel cylinder $5_{rr}$) of four wheels (left front wheel $4_{fl}$, right front wheel $4_{fr}$, left rear wheel $4_{rl}$ and right rear wheel $4_{rr}$), thereby brake is applied to four wheels and the vehicle is braked.

The brake drive section 1 is a hydraulic unit constituted by a pressure generating source, a pressure reducing valve, a pressure amplifying valve and the like and can feed a brake pressure to the respective wheel cylinders $5_{fl}$, $5_{fr}$, $5_{rl}$ and $5_{rr}$ independently.

The wheel speed of the wheels $4_{fl}$, $4_{fr}$, $4_{rl}$ and $4_{rr}$ is detected by wheel speed sensors, a left front wheel speed sensor $6_{fl}$, a right front wheel speed sensor $6_{fr}$, a left rear wheel speed sensor $6_{rl}$ and a right rear wheel speed sensor $6_{rr}$, respectively. Further, a steering column of a steering wheel is provided with a steering angle sensor 7. Further, the vehicle has a longitudinal acceleration sensor 8 for detecting a longitudinal acceleration of the vehicle, a lateral acceleration sensor 9 for detecting a lateral acceleration of the vehicle and a yaw rate sensor 10 for detecting a yaw rate of the vehicle.

Signals from the wheel speed sensors 6, the steering wheel sensor 7, the longitudinal acceleration sensor 8, the lateral acceleration sensor 9 and the yaw rate sensor 10, are inputted to a control unit 15.

Further, a pair of CCD cameras using a charge coupled device (CCD) are installed on the front part of a ceiling of a passenger compartment at a specified lateral interval and is connected with the control unit 15.

The control unit 15 is composed of a vehicle speed calculating section 15a, an obstacle recognition section 15b, a deceleration judging section 15c, a deceleration calculating section 15d, a brake control section 15e, a braking distance judging section 15f, a first yaw rate calculating section 15g, a second yaw rate calculating section 15h, a target yaw rate establishing section 15f and an automatic brake control section 15j.

The vehicle speed calculating section 15a calculates a vehicle speed V using the wheel speeds of the respective wheels detected by the wheel speed sensor 6 and the calculated vehicle speed V is outputted to the obstacle recognition section 15b, the deceleration judging section 15c, the deceleration calculating section 15d, the braking distance judging section 15f, the first yaw rate calculating section 15g, the second yaw rate calculating section 15h and the automatic brake control section 15j. The wheel speed sensor 6, the vehicle speed calculating section 15a, the steering angle sensor 7, the longitudinal acceleration sensor 8, the lateral acceleration sensor 9 and the yaw rate sensor 10 form a running condition detecting means.

The obstacle recognition section 15b calculates distance information over an entire image of a pair of stereoscopic pictures taken by the CCD cameras 11 from a deviation amount of an object between these pictures according to the principle of triangulation and produces distance images presenting three-dimensional distance distribution. Furthermore, the obstacle recognition section 15b makes image processes such as extracting a feature of a box-like pattern from the distance images, identifies an object existing ahead of an own vehicle as an obstacle from thus obtained solid objects and detects a distance $L_r$ between the obstacle and the own vehicle, a relative traveling speed $V_r$ of the obstacle versus the own vehicle and a width W of the obstacle. The distance $L_r$ and the relative speed $V_r$ are outputted to the deceleration judging section 15c, the deceleration calculating section 15d, the braking distance judging section 15f and the first yaw rate calculating section 15g and the width W is outputted to the first yaw rate calculating section 15g. That is, the pair of the CCD cameras 11 and the obstacle recognition section 15g form an obstacle recognition means.

According to the first embodiment, the deceleration judging section 15c compares the distance $L_r$ with a threshold distance $L_{lmt}$ which has been memorized beforehand and judges whether or not the distance $L_r$ is smaller than the threshold distance $L_{lmt}$. The result of judgment is outputted to the deceleration calculating section 15d.

When the distance $L_r$ becomes smaller than the threshold distance $L_{lmt}$ ($L_r$ $L_{lmt}$), the deceleration calculating section 15d calculates a road gradient $\theta_{SL}$ according to a formula (1) shown below and calculates an automatic braking deceleration $\alpha_s$ which is a target deceleration according to the relative speed Vr and the road gradient $\theta_{SL}$. The established automatic braking deceleration $\alpha_s$ is outputted to the brake control section 15e.

The road gradient $\theta_{SL}$ (%) is expressed as follows:

$$\theta_{SL} = (Gx-\text{rate of change of vehicle velocity})/g100 \quad (1)$$

where Gx is longitudinal acceleration (m/s$^2$) and g is gravitational acceleration (m/s$^2$). The road gradient $\theta_{SL}$ (%) may be calculated from an engine output torque (N-m), a torque ratio of a torque converter (in case of an automatic transmission vehicle), a gear ratio of a transmission, a final reduction gear ratio, a tire radius (m), a running resistance (N), a vehicle weight (kg), a change of rate of vehicle velocity (m/s$^2$) and gravitational acceleration (m/s$^2$). Also, the road gradient $\theta_{SL}$ may be obtained from altitude data of a navigation apparatus or may be obtained from road configuration data prepared based on image data of a CCD camera.

The automatic braking deceleration $\alpha_s$ is established at a larger value as the relative velocity Vr is high. This is because as the relative velocity is high, a larger deceleration is needed in order to make the relative velocity nil. Further, the automatic braking deceleration $\alpha_s$ is established at a large value in order to prevent deceleration from becoming too low in case where the road gradient $\theta_{SL}$ is a down-grade and is established at a small value in order to prevent deceleration from becoming too high in case where the road gradient $\theta_{SL}$ is an up-grade. The automatic braking deceleration $\alpha_s$ may be calculated by multiplying a predetermined constant by a constant variably established according to the relative velocity $V_r$ or the road gradient $\theta_{SL}$ or may be established from a map parameterizing the relative velocity $V_r$ and the road gradient $\theta_{SL}$. Further, in this embodiment, the automatic braking deceleration $\alpha_s$ is designed to be established according to the relative velocity Vr and the road gradient $\theta_{SL}$, however this automatic braking deceleration $\alpha_s$ may be established only by the relative velocity depending upon the vehicle model, vehicle specifications and other conditions or may be established only by the road gradient $\theta_{SL}$ or may be a fixed value.

The brake control section 15e receives a signal of automatic braking deceleration $\alpha_s$ from the deceleration calculating section 15d or a signal of target braking force FB which will be described hereinafter and a signal of a selected wheel for braking from the automatic brake control section 15j and outputs a signal of brake fluid pressure corresponding to those inputted signals to the brake drive section 1.

The braking distance judging section 15f inputs a signal of actual deceleration $a_x$ from the longitudinal acceleration sensor 8, signals of distance $L_r$ and relative velocity $V_r$ from the obstacle recognition section 15b and a signal of automatic braking deceleration $\alpha_s$ from the deceleration calculating section 15d and judges whether or not the vehicle can continue deceleration without contacting an obstacle ahead of the own vehicle.

This judgment is made by comparing the distance $L_r$ with a braking distance ($V_r^2/(2a_x)$) obtained from the relative velocity $V_r$ and the actual deceleration $a_x$. In case where the distance $L_r$ is smaller than the braking distance ($V_r^2/(2a_x)$), it is judged that the vehicle will contact the obstacle before the deceleration is completed and in case where the distance $L_r$ is larger than the braking distance ($V_r^2/(2a_x)$), it is judged that the deceleration will be completed without contacting the obstacle. The result of the judgment is outputted to a first yaw rate calculating section 15g and a second yaw rate calculating section 15h, respectively. The braking distance judging section acts as a braking distance judging means.

The first yaw rate calculating section 15g receives signals of the actual deceleration ax from the longitudinal acceleration sensor 8, the vehicle speed V from the vehicle speed calculating section 15a, the distance $L_r$ from the obstacle recognition section 15b, the relative velocity $V_r$ and the width W of the obstacle and calculates a yaw rate (hereinafter referred to as "first yaw rate $\gamma_1$") required for turning around the obstacle ahead based on these data. That is, this first yaw rate calculating section 15g acts as a first parameter calculating means. The calculated first yaw rate $\gamma_1$ is outputted to the target yaw rate establishing section 15i.

Specifically, the first yaw rate $\gamma_1$ is calculated according to the following formula (4).

First, a time $T_a$ required for the vehicle to reach the obstacle is expressed as;

$$T_a = (V_r - (V_r^2 - 2 \cdot a_x)^{1/2})/a_x \quad (2)$$

A lateral acceleration $a_y$ required for the vehicle to move in the lateral direction is expressed as;

$$a_y = 2 \cdot W/T_a^2 \quad (3)$$

the first yaw rate $\gamma_1$ required to obtain the lateral acceleration $a_y$ is expressed as;

$$\gamma_1 = a_y/V \tag{4}$$

The second yaw rate calculating section 15h is for calculating a yaw rate currently generating as a second yaw rate $\gamma_2$. The second yaw rate calculating section 15h receives a signal of a steering wheel angle $\theta_H$ from the steering wheel angle sensor 7, and a signal of the vehicle speed V from the vehicle speed calculating section 15a and calculates the second yaw rate $\gamma_2$. The second yaw rate calculating section 15h acts as a second parameter calculating means. The calculated second yaw rate $\gamma_2$ is outputted to a target yaw rate establishing section 15i.

Specifically, the second yaw rate $\gamma_2$ is calculated according to the following formula (5):

$$\gamma_2 = 1/(1+T \cdot S) \cdot \gamma_{t0} \tag{5}$$

where S is Laplace operator; T is first-order lag time constant; and $\gamma_{t0}$ is yaw rate stationary value.

Further, first-order lag time constant T is obtained from the following formula (6):

$$T = (m \cdot L_f \cdot V)/(2 \cdot L \cdot K_r) \tag{6}$$

where m is vehicle weight; L is wheel base; $L_f$ is distance between front axle and center of gravity and $k_r$ is rear equivalent cornering power.

Further, the yaw rate regular value $\gamma_{t0}$ is given by the following formula (8):

$$\gamma_{t0} = G\gamma\delta \cdot (\theta_H/n) \tag{7}$$

where $G\gamma\delta$ is yaw rate gain; n is gear ratio of steering gear and $\theta_H$ is On the other hand, yaw rate gain $G\gamma\delta$ is obtained from the following formula (8):

$$G\gamma\delta = 1/(1+A \cdot V^2) \cdot (V/L) \tag{8}$$

where A is stability factor which is determined by vehicle specifications and is calculated from the following formula (9):

$$A = -(m/(2 \cdot L^2)) \cdot (L_f \cdot K_f - L_r \cdot K_r)/(K_f K_r) \tag{9}$$

where $L_r$ is distance between rear axle and center of gravity and $K_f$ is front equivalent cornering power.

The target yaw rate establishing section 15i receives a signal of first yaw rate $\gamma_1$ from the first yaw rate calculating section 15g and a signal of second yaw rate $\gamma_2$ from the second yaw rate calculating section 15h and establishes a larger one of these as a target yaw rate $\gamma_t$. The target yaw rate establishing section 15i acts as a target yaw rate establishing means in the present invention.

The automatic brake control section 15j controls brakes of respective wheels so as to generate a turning force over the vehicle. First, the automatic brake control section 15j outputs signals of a target braking force FB and a selected object wheel to the brake control section 15e. Then, the brake control section 15e outputs a signal of brake fluid pressure corresponding to these signals to the brake drive section 1 to generate a turning force in the vehicle. That is, in the present invention, the automatic brake control section 15j, the brake control section 15e and the brake drive section 1 constitute an automatic brake control means and a vehicle behavior control means.

For example, as the applicant of the present invention proposes in Japanese Patent Application Laid-open No. Toku-Kai-Hei 10-157589, the automatic brake control section 15j establishes a target braking force and a selected object wheel and outputs these signals to the brake control section 15e.

The automatic brake control section 15j inputs a steering wheel angle $\theta_H$ from the steering wheel angle sensor 7, a lateral acceleration $G_y$ from the lateral acceleration sensor 9, a vehicle speed V from the vehicle speed calculating section 15a and a target yaw rate $\gamma_t$ from the target yaw rate establishing section 15j, calculating a target yaw moment $M_z$ based on these, and obtains a target braking force FB according to the following formula (10).

$$FB = M_z/(d/2) \tag{10}$$

where d is tread of a vehicle.

The turning direction of the vehicle is judged by an actual yaw rate from the yaw rate sensor 10. When the calculated target moment $M_z$ has the same turning direction as the actual yaw rate, a rear inner wheel of the turning circle is selected as an object wheel to which the braking force is applied. When the target moment $M_z$ has an opposite turning direction to the actual yaw rate, a front outer wheel of the turning circle is selected as an object wheel to which the braking force is applied. Specifically, the following combination is established beforehand. With respect to the direction of moments, actual yaw rate $\gamma$ and target yaw moment $M_z$, the left turn denotes positive (+) and the right turn denotes (−).

In order to judge a straight line running condition of the vehicle, $\epsilon$ is established as a positive number close to zero which has been obtained from experiments or calculations beforehand. To judge that the target yaw moment $M_z$ is approximately zero, $\epsilon M_z$ is established as a positive number close to zero which has been obtained from experiments or calculations.

Figure 3:
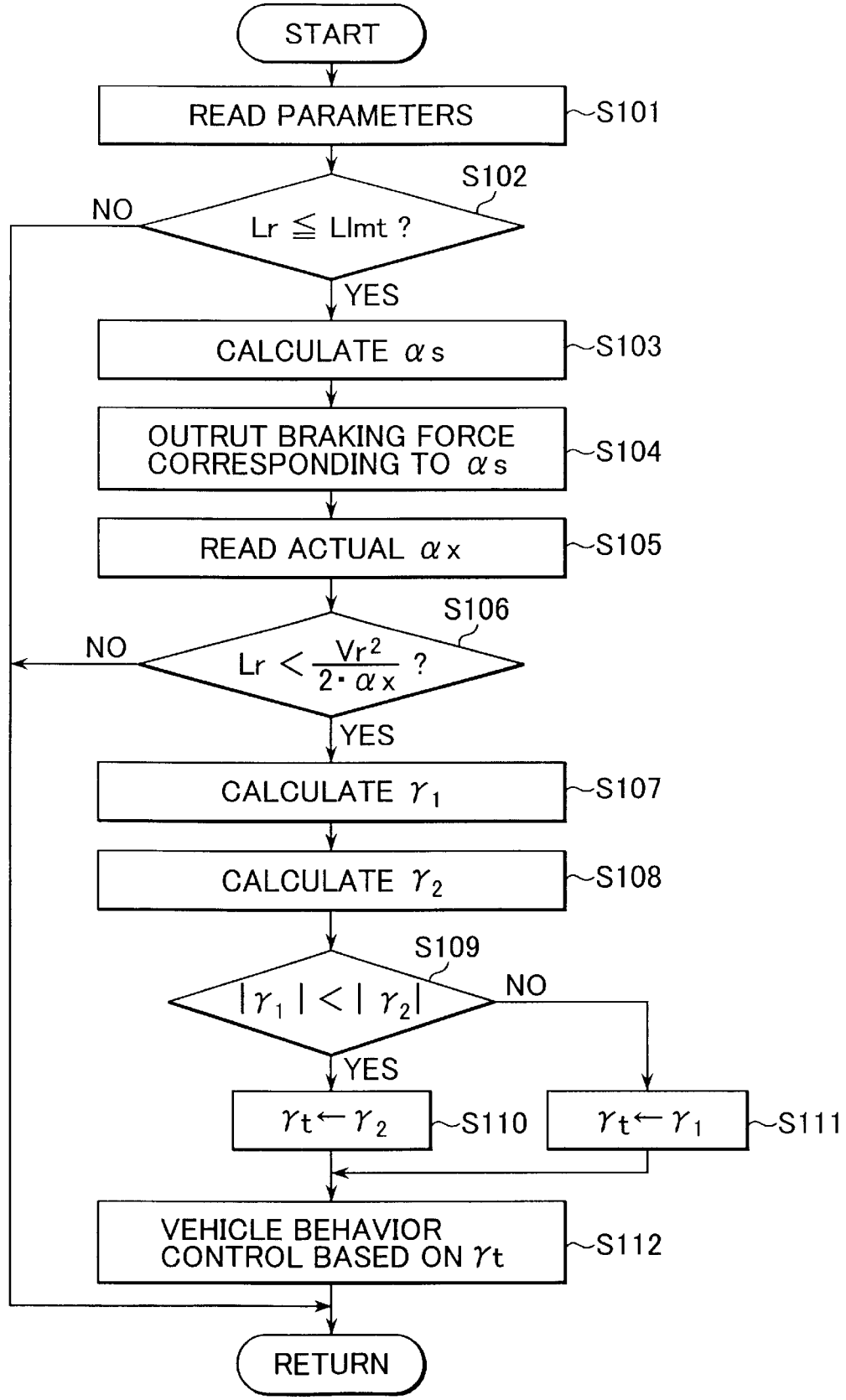
FIG. 3 is a flowchart of a vehicle motion control system.

Case 1: when $\gamma > \epsilon$ and $M_z > \epsilon M_z$ left rear wheel braked
Case 2: when $\gamma > \epsilon$ and $M_z < -\epsilon M_z$ right front wheel braked
Case 3: when $\gamma < \epsilon$ and $M_z > \epsilon M_z$ left front wheel braked
Case 4: when $\gamma < \epsilon$ and $M_z < -\epsilon M_z$ left rear wheel braked
Case 5: when the vehicle in approximately straight line running condition of $|\gamma| \leq \epsilon$ or when the vehicle is turning condition of $M_z \leq \epsilon M_z$ no brake applied to any wheel Next, an operation of thus constituted motion control system will be described by reference to a flowchart of FIG. 3. This flowchart is repeatedly executed every specified time. First, at a step (hereinafter referred to as just "S") 101, signals from sensors 6, 7, 8, 9, 10 and a signal from the pair of CCD cameras are read. Particularly, the vehicle speed V in the vehicle speed calculating section 15a, the distance $L_r$ to an obstacle, the relative velocity $V_r$ the width of the obstacle in the obstacle recognition section 15b and other necessary parameters are detected and the program goes to S102.

At S102, in the deceleration judging section 15c, the distance Lr is compared with the threshold distance $L_{lmt}$ memorized. In case where the distance $L_r$ is smaller than the threshold distance $L_{lmt}$ ($L_r \leq L_{lmt}$), the program goes to S103 and in case where the distance $L_r$ is larger than the threshold distance $L_{lmt}$ ($L_r > L_{lmt}$), the program leaves the routine.

As a result of the comparison at S102, when the program goes to S103, the deceleration calculating section 15d calculates a road gradient $\theta_{SL}$ according to the formula (1) and calculating a target deceleration according to the relative speed Vr and the $\theta_{SL}$, establishing the deceleration as an automatic braking deceleration $\alpha_s$, and outputs the deceleration to the brake control section 15e.

Then, the program goes to S104 where the brake control section 15e outputs a signal of fluid pressure according to the automatic braking deceleration $\alpha_s$ to the brake drive section 1.

After that, the program goes to S105 where the actual deceleration $a_x$ detected by the longitudinal acceleration 8 is read and then goes to S106.

At S106, in the braking distance judging section 15*f*, the distance $L_r$ is compared with the braking distance $(V_r^2/(2·a_x))$ until deceleration is completed. Further, in case where the distance $L_r$ is smaller than the braking distance $(V_r^2/(2·a_x))$, it is judged that the vehicle can not complete deceleration without contacting the obstacle ahead and the program goes to S107. On the other hand, in case where the distance $L_r$ is larger than the braking distance $(V_r^2/(2·a_x))$, it is judged that the vehicle can complete deceleration without contacting the obstacle ahead and the program leaves the routine.

When the program goes to S107 as a result of the judgment that the vehicle can not complete deceleration without contacting the obstacle ahead, based on the actual deceleration $a_x$, the relative speed $V_r$, the distance $L_r$ and the width W, the first yaw rate calculating section 15*g* calculates the first yaw rate $\gamma_1$ necessary for avoiding the obstacle by a turn according to the formula (4).

Next, the program goes to S108 where the second yaw rate calculating section 15*h* calculates the second yaw rate $\gamma_2$ based on the steering wheel angle $\theta_H$ and the vehicle speed V according to the formula (5).

After that, the program goes to S109 where in the target yaw rate establishing section 15*i* an absolute value $|\gamma_1|$ of the first yaw rate $\gamma_1$ is compared with an absolute value $|\gamma_2|$ of the second yaw rate $\gamma_2$. In case where the absolute value $|\gamma_1|$ of the first yaw rate $\gamma_1$ is smaller than the absolute value $|\gamma_2|$ of the second yaw rate $\gamma_2$, that is, $|\gamma_1|<|\gamma_2|$, the program goes to S110 where since the vehicle can avoid contacting the obstacle with the present running conditions retained, the target yaw rate $\gamma_t$ is established at the second yaw rate $\gamma_2$. Further, in case where the absolute value $|\gamma_1|$ of the first yaw rate $\gamma_1$ is larger than the absolute value $|\gamma_2|$ of the second yaw rate $\gamma_2$, that is, $|\gamma_1|\geq|\gamma_2|$, the program goes to S111 where the target yaw rate $\gamma_t$ is established at the first yaw rate $\gamma_1$ to avoid the obstacle.

After thus the target yaw rate $\gamma_t$ is established, the program goes to S112 where the automatic brake control 15*j* calculates the target moment $M_z$ based on the steering wheel angle $\theta_H$, the lateral acceleration $G_y$, the vehicle speed V and the target yaw rate $\gamma_t$ and based on the target moment $M_z$ the target braking force FB is calculated. Further, based on the actual yaw rate $\gamma$ and the target yaw moment $M_z$, the wheel to be braked is selected. Thus, the vehicle behavior control is formed.

According to the first embodiment, in case where the avoidance of contacting the obstacle is inadequate only with deceleration, a turning force is given to the vehicle by applying brake to the selected wheel, thereby the vehicle can surely avoid contacting the obstacle.

In this embodiment, the function of the automatic brake control section 15*j* is described citing an example of the braking force control apparatus proposed in Toku-Kai-Hei 10-157589, however other examples may be applied to the automatic brake control section according to the present invention.

Figure 4:
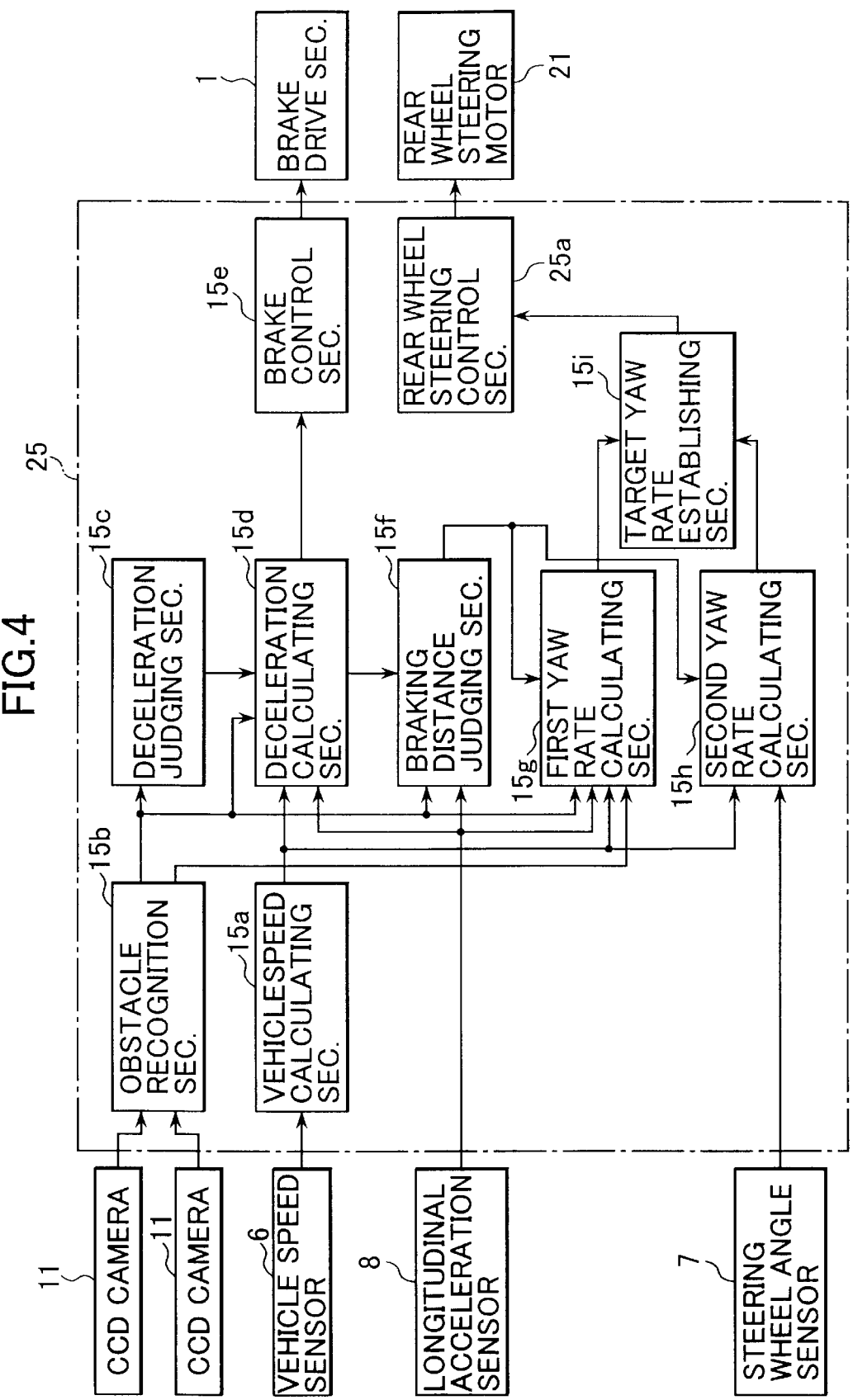
FIG. 4 is a functional block diagram showing a vehicle motion control system according to a second embodiment of the present invention.

Next, a second embodiment will be described by reference to FIGS. 4 and 5. According to the second embodiment, the vehicle behavior control means comprises a rear wheel steering control means for automatically steering rear wheels.

Figure 5:
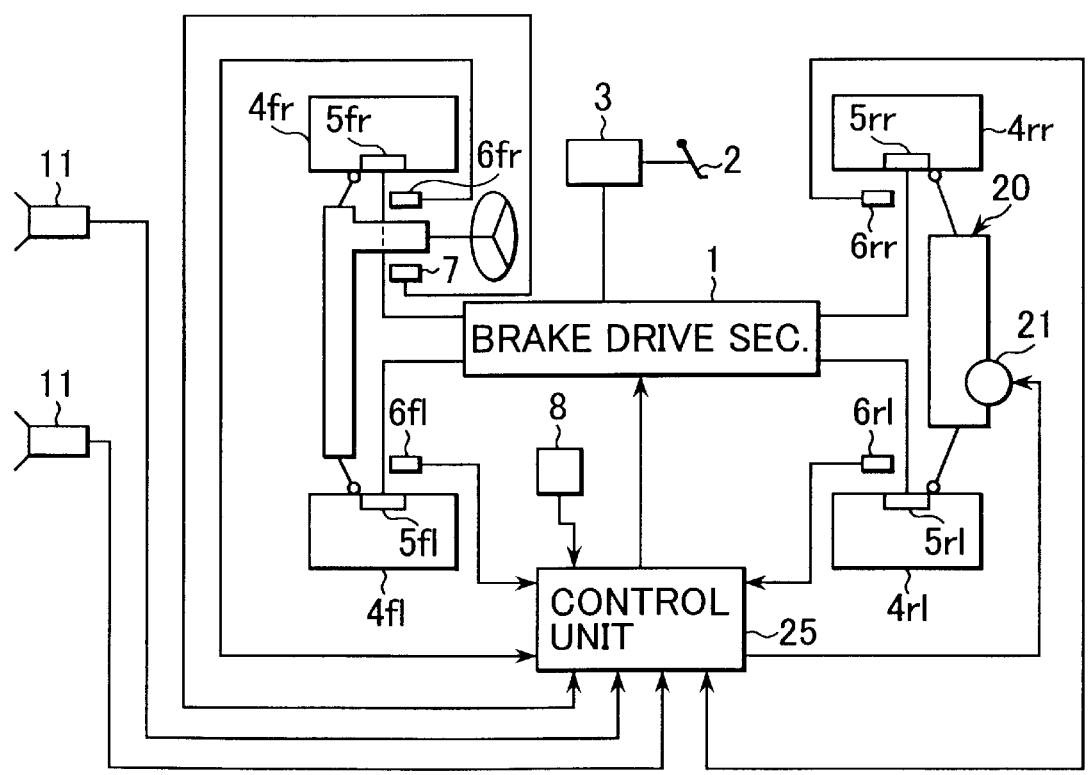
FIG. 5 is an explanatory view showing an overall schematic construction of a vehicle motion control system according to the second embodiment.

As shown in FIG. 5, the vehicle is equipped with a rear wheel steering section 20. The rear wheel steering section 20 is provided with a rear wheel steering motor 21 which is controlled by a rear wheel control section 25*a* of a control unit 25. A power of the rear wheel steering motor 21 is transmitted through a worm and worm gear and a link mechanism to the left rear wheel 4rl and the right rear wheel 4rr respectively to steer these rear wheels.

Further, the control unit 25 comprises the vehicle speed calculating section 15*a*, the obstacle recognition section 15*b*, the deceleration judging section 15*c*, the deceleration calculating section 15*d*, the brake control section 15*e*, the braking distance judging section 15*f*, the first yaw rate calculating section 15*g*, the second yaw rate calculating section 15*h*, the target yaw rate establishing section 15*i* and the rear wheel steering control section 25*a*. In this embodiment, the automatic brake control section 15*j* is replaced with the rear wheel steering control section 25*a*.

In the rear wheel steering control section 25*a*, a rear wheel steering angle $\gamma_r$ is established by the following formula (11):

$$\delta_r = k \cdot \gamma_t \qquad (11)$$

where k is a constant predetermined.

When the target yaw rate $\gamma_t$ is inputted from the target yaw rate establishing section 15*i*, the rear wheel steering control section 25*a* drives the rear wheel steering motor 21 such that the rear wheels have a steering angle corresponding to the inputted target yaw rate $\gamma_t$, respectively, and as a result a turning force is generated in the vehicle.

Thus, according to the second embodiment, in case where the vehicle can not avoid contacting an obstacle ahead only with deceleration, an automatic steering of rear wheels generates a turning force in the vehicle, thereby the vehicle can surely avoid contacting the obstacle.

Further, in the second embodiment, the rear wheel steering control section 25*a* makes a steering control according to a yaw rate proportional method, however other methods may be employed. Further, a hydraulic actuator may be used for the rear wheel steering motor 21.

Figure 6:
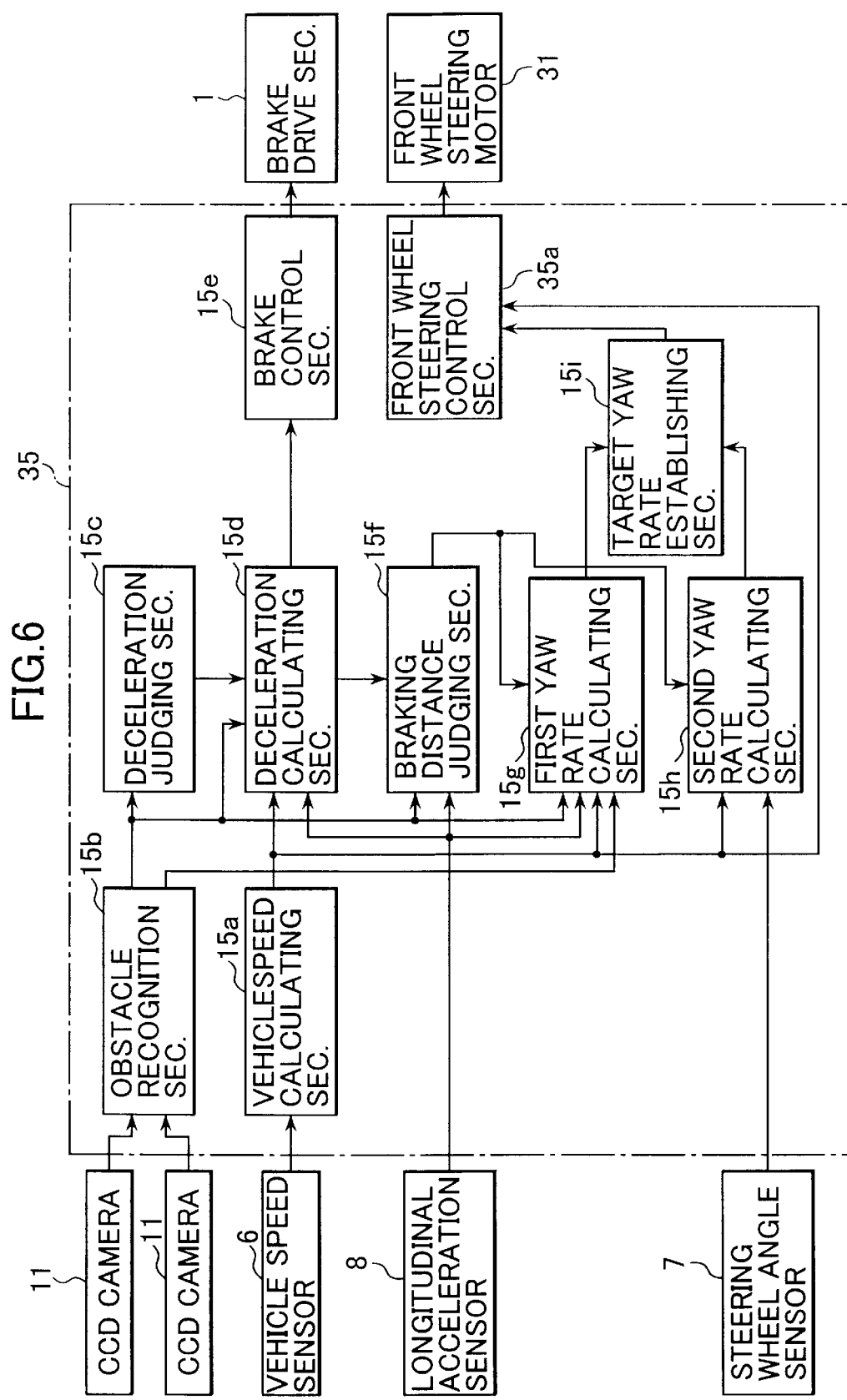
FIG. 6 is a functional block diagram showing a vehicle motion control system according to a third embodiment of the present invention.
Figure 7:
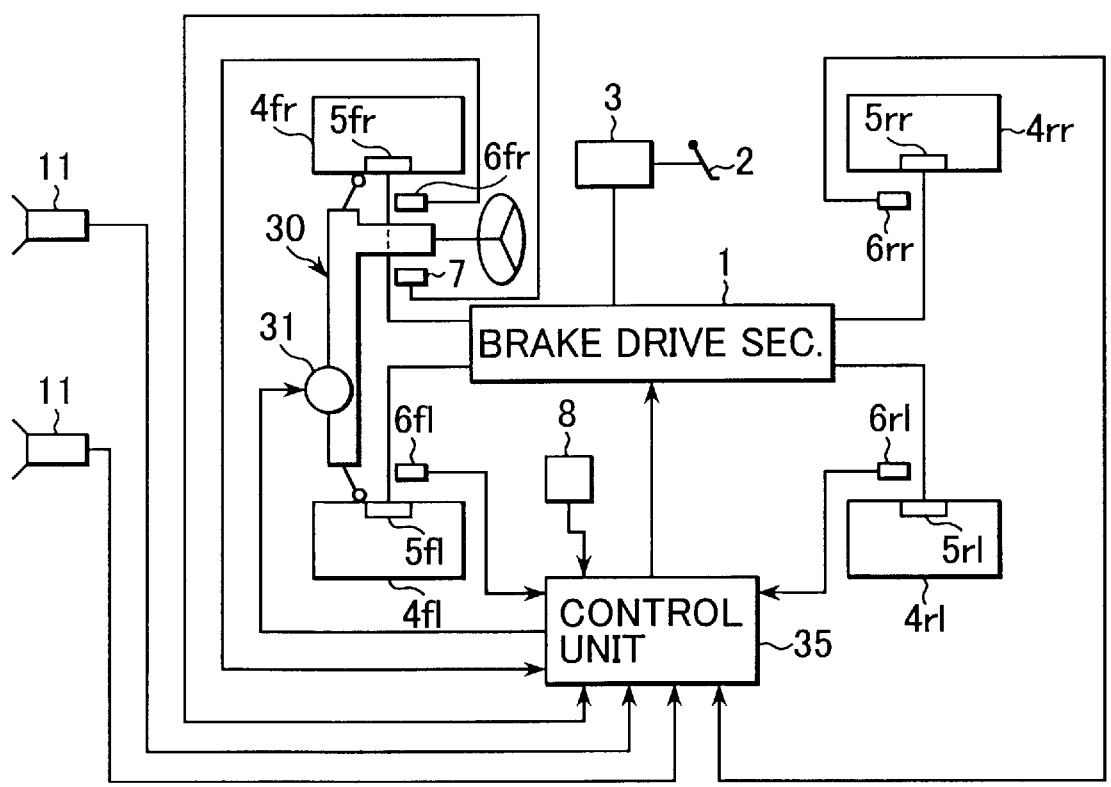
FIG. 7 is an explanatory view showing an overall schematic construction of a vehicle motion control system according to the third embodiment.

FIGS. 6 and 7 shows a third embodiment of the present invention. According to the second embodiment, the vehicle behavior control means consttutes a front wheel steering control means for automatically steering front wheels.

Referring to FIG. 7, reference numeral 30 denotes a front wheel steering section for automatically steering front wheels and reference numeral 31 denotes a front wheel steering motor whose power is transmitted to the left front wheel 4fl and the right front wheel 4fr through a worm and worm wheel and a link mechanism.

Further, a control unit 35 comprises the vehicle speed calculating section 15*a*, the obstacle recognition section 15*b*, the deceleration judging section 15*c*, the deceleration calculating section 15*d*, the brake control section 15*e*, the braking distance judging section 15*f*, the first yaw rate calculating section 15*g*, the second yaw rate calculating section 15*h*, the target yaw rate establishing section 15*i* and the front wheel steering control section 35*a*. The automatic brake control section 15*j* of the first embodiment is changed to the front wheel steering control section 35*a*.

When the front wheel steering control section 35*a* inputs a target yaw rate $\gamma_t$, a front wheel steering angle $\delta_r$ is calculated according to the following formula (12):

$$\delta_r = (1+T \cdot S) \cdot \gamma_t / G \cdot \gamma \delta \qquad (12)$$

Then, the front wheel steering control section 35*a* rotates the front wheel steering motor 31 by the displacement necessary to obtain the front wheel steering angle $\delta_r$. That is, according to the third embodiment, when the target yaw rate $\gamma_t$ is inputted from the target yaw rate establishing section 15*i*, the front wheel steering control section 35*a* drives the front wheel steering motor 31 so as to obtain a required front wheel steering angle, and as a result a turning force is generated in the vehicle.

Thus, according to the third embodiment, in case where the vehicle can not avoid contacting an obstacle ahead only with deceleration, an automatic steering of front wheels generates a turning force in the vehicle, thereby the vehicle can surely avoid contacting the obstacle.

In the aforesaid embodiments of the present invention, the target yaw rate calculated from the first yaw rate and the second yaw rate is used as a parameter needed for moving the vehicle in the lateral direction, however, alternatively, a lateral acceleration calculated from a first lateral acceleration and a second lateral acceleration is used for calculating a target lateral acceleration and based on this target lateral acceleration the vehicle behavior may be controlled.

Further, the automatic brake control means in the first embodiment, the rear wheel steering control means in the second embodiment, and the front wheel steering control means in the third embodiment are the vehicle behavior control means for laterally moving the vehicle independently, respectively. However, the vehicle behavior control means may be constituted by the combination of a plurality of these control means.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A motion control system for a vehicle having an obstacle recognition device for detecting an obstacle in front of the vehicle and obtaining information of the obstacle, and a running condition detecting device for detecting running conditions of the vehicle, comprising:

braking distance judgment means judging, when a deceleration is applied to said vehicle, whether or not said vehicle can finish said deceleration without contacting said obstacle based on said information of said obstacle and said running conditions;

first parameter calculating means for calculating a first parameter necessary to generate a turning force that will cause the vehicle to make a lateral avoidance motion based on said information of the obstacle and said running conditions;

second parameter calculating means for calculating a second parameter representing a presently generated turning force in said vehicle based on said running conditions;

target establishing means for when it is judged that said vehicle can not finish said deceleration without contacting said obstacle, establishing a target parameter by comparing said first parameter with said second parameter; and vehicle behavior control means for generating said lateral avoidance motion of said vehicle at least in accordance with said target parameter.

2. The motion control system according to claim 1, wherein
said first parameter is either a yaw rate or a lateral acceleration.

3. The motion control system according to claim 1, wherein
said second parameter is either a yaw rate or a lateral acceleration.

4. The motion control system according to claim 1, wherein
said vehicle behavior control means is at least one of an automatic brake control means for braking a selected wheel to generate a turning force, a rear wheel steering control means for automatically steering a rear wheel and a front wheel steering control means for automatically steering a front wheel.

5. A vehicle motion control system for avoiding an obstacle in front of a vehicle, said system comprising:

an obstacle recognition device for detecting and obtaining obstacle information representative of an obstacle in front of the vehicle;

a running condition detector for detecting running conditions of the vehicle;

a braking distance judging device for judging whether the vehicle can finish a deceleration without contacting the obstacle during deceleration of the vehicle based on said obstacle information and said running conditions;

a first yaw rate calculator for calculating a first yaw rate to be applied to the vehicle based on said obstacle information and said running conditions;

a second yaw rate calculator for calculating a second yaw rate which is a present yaw rate of the vehicle based on said running conditions;

a target yaw rate calculator for calculating a target yaw rate by comparing said first yaw rate with said second yaw rate; and a vehicle behavior controller for generating a turning force of the said vehicle necessary to avoid the obstacle by turning motion in accordance with at least said target yaw rate.

6. The motion control system according to claim 5, wherein said target yaw rate calculator calculates said target yaw rate by selecting a larger of said first yaw rate and said second yaw rate.

7. The motion control system according to claim 5, wherein
said vehicle behavior controller generates turning force by braking a selected wheel.

8. The motion control system according to claim 5, wherein
said vehicle behavior controller generates turning force by automatically steering at least one of a front wheel and a rear wheel.

9. A vehicle motion control system for avoiding an obstacle ahead of a vehicle, said system comprising:

an obstacle recognition device for detecting an obstacle and for obtaining obstacle information representative of the obstacle;

a running condition detector for detecting running conditions of the vehicle;

a braking distance judging device for judging whether the vehicle can complete a deceleration without contacting the obstacle during deceleration of the vehicle based on said obstacle information and said running conditions;

a first yaw rate calculator for calculating a first yaw rate needed to move the vehicle in a lateral direction to avoid the obstacle based on said obstacle information and said running conditions;

a second yaw rate calculator for calculating a current yaw rate of the vehicle as a second yaw rate based on said running conditions;

a target yaw rate calculator for calculating a target yaw rate by comparing said first yaw rate with said second yaw rate; and a vehicle behavior controller for generating a lateral movement of the vehicle to avoid the obstacle in accordance with at least said target yaw rate.

10. The motion control system according to claim 9, wherein said target yaw rate calculator calculates said target yaw rate by selecting a larger of said first yaw rate and said second yaw rate.

11. The motion control system according to claim 9, wherein said vehicle behavior controller generates said lateral movement of the vehicle by turning force generated by braking a selected wheel.

12. The motion control system according to claim 9, wherein said vehicle behavior controller generates said lateral movement of the vehicle by turning force generated by automatically steering at least one of front wheels and rear wheels of the vehicle.

13. A motion control system of a vehicle for avoiding an obstacle ahead of the vehicle, said system comprising:

an obstacle recognition device for detecting an obstacle and for obtaining obstacle information representative of the obstacle;

a running condition detector for detecting running conditions of the vehicle;

a braking distance judging device for judging whether the vehicle can complete a deceleration without contacting the obstacle during deceleration of the vehicle based on said obstacle information and said running conditions;

a first lateral acceleration calculator for calculating a first lateral acceleration needed to move the vehicle in a lateral direction to avoid the obstacle based on said obstacle information and said running conditions;

a second lateral acceleration calculator for calculating a current lateral acceleration of the vehicle as a second lateral acceleration based on said running conditions;

a target lateral acceleration calculator for calculating a target lateral acceleration by comparing said first lateral acceleration with said second lateral acceleration; and a vehicle behavior controller for generating a lateral movement of the vehicle to avoid the obstacle in accordance with at least said target lateral acceleration.

14. The motion control system according to claim 13, wherein said target lateral acceleration calculator calculates said target lateral acceleration by selecting a larger of said first lateral acceleration and said second lateral acceleration.

15. The motion control system according to claim 13, wherein said vehicle behavior controller generates a lateral movement of the vehicle by turning force generated by braking a selected wheel.

16. The motion control system according to claim 13, wherein said vehicle behavior controller generates a lateral movement of the vehicle by turning force generated by automatically steering at least one of front wheels and rear wheels of the vehicle.

* * * * *